United States Patent [19]
Swinney

[11] Patent Number: 5,586,939
[45] Date of Patent: Dec. 24, 1996

[54] CONSTANT VELOCITY JOINT WITH SPHERICAL BALL AND TONGUE AND GROOVE INTERCONNECTION

[76] Inventor: Louis E. Swinney, 6333 Long, Suite 200, Shawnee, Kans. 66216

[21] Appl. No.: 249,301

[22] Filed: May 25, 1994

[51] Int. Cl.$^6$ ........................................ F16D 3/16
[52] U.S. Cl. ..................... 464/106; 464/151; 464/904
[58] Field of Search ........................... 464/106, 151, 464/145, 109, 110, 147, 157, 904, 185

[56] References Cited

U.S. PATENT DOCUMENTS

| | | | |
|---|---|---|---|
| 595,538 | 12/1897 | Gardner | 464/151 |
| 856,777 | 6/1907 | Farkas et al. | 464/151 |
| 1,224,286 | 5/1917 | Dontje et al. | 464/151 |
| 1,443,930 | 1/1923 | Richards | 464/151 X |
| 1,576,089 | 3/1926 | Burns | 464/151 X |
| 2,402,006 | 6/1946 | Anderson | 464/151 |
| 2,479,129 | 8/1949 | Moore | 464/151 |
| 2,760,358 | 8/1956 | Helm et al. | 464/106 |
| 2,841,968 | 7/1958 | Helmke | 464/106 |
| 2,900,810 | 8/1959 | Schultze | 464/904 X |
| 2,921,451 | 1/1960 | Helmke | 464/904 X |
| 4,188,801 | 2/1980 | Hugh et al. | 464/106 |
| 5,037,354 | 8/1991 | Shaff et al. | 464/106 X |

OTHER PUBLICATIONS

*Principles of Automotive Vehicles*, Jan. 1956, "216. Constant–Velocity Universal Joints," pp. 336–342, by Departments of the Army and the Air Force.

*Pictorial Handbook of Technical Devices*, 1971, "Angular Couplings & Universal Joints", p. 17, by Paul Grafstein and Otto B. Schwarz.

Primary Examiner—Daniel P. Stodola
Assistant Examiner—Eileen A. Dunn
Attorney, Agent, or Firm—Shook, Hardy & Bacon L.L.P.

[57] ABSTRACT

A constant velocity universal joint wherein the relatively moveable components are substantially contained within a cup-like housing having an open end. A spherical enlargement on the input shaft provides a sealing surface which may be sealed with relatively conventional seals. A concavo-convex connecting link is interconnected with both the input shaft and with the output shaft through interconnected arcuate T-shaped tongues and grooves which extend concentrically to the spherical enlargement surface to permit the joint components to maintain proper position at all times.

6 Claims, 2 Drawing Sheets

CONSTANT VELOCITY JOINT WITH SPHERICAL BALL AND TONGUE AND GROOVE INTERCONNECTION

BACKGROUND OF THE INVENTION

FIELD OF THE INVENTION

This invention relates to joints which interconnect sections of drive shafts to permit angular displacement between the sections, and more particularly, to a universal joint of the constant velocity type.

Shaft sections subject to angular displacement of their axes with respect to one another are commonly interconnected by a universal joint to permit one shaft section to drive another. The universal joint permits the sections to pivot at the connection, and also permits the transmission of rotary motion from one section to the other. On an automobile, a universal joint transmits power from the engine through a drive shaft, even though the engine is relatively rigidly mounted to the vehicle frame at a higher level than the axle, and the axle is constantly moving up and down in relation to the frame.

An ordinary universal joint, consisting of two yokes at right angles to one another and pivotally interconnected with a journal, causes a driven shaft to rotate at a variable speed in respect to the driving shaft. There is a cyclic variation, in the form of an acceleration and a deceleration of the speed, twice during each revolution. The extent of the fluctuation depends on the amount of angularity between the shafts. The greater the angle, the greater the variation in the speed of the two shafts during each revolution.

These velocity fluctuations result because the journal connecting the two yokes does not allow free movement other than a pivoting action. The journal wobbles as the joint rotates. When the journal tilts toward the output shaft, it adds to the rotary speed of the output. When the journal tilts away from the output shaft it subtracts from the speed of the output. The input and output shaft speeds are equal only when the journal lies in a plane which bisects the angle between the shafts.

DESCRIPTION OF THE PRIOR ART

Special types of universal joints have been developed to provide for the transmission of uniform speed across the joint. These joints are commonly called "constant velocity" joints. Such joints are constructed in a manner so that a plane passed through the points of the driving engagement in the joint will at all times bisect the angle between the driving and the driven shaft.

Various constructions for universal joints have been devised to provide the desired constant velocity to be transmitted by the joint. The designs heretofore suggested for such constant velocity joints have had a number of distinct drawbacks. A major problem has been the complexity of such devices. Many such constructions involve a substantial number of moving parts, each requiring relatively complex machining operations during fabrications, and also requiring that manufacturing tolerances be held to very close limits. This has resulted in relatively high costs for such joints.

Another significant problem with conventional constant velocity joints has been the difficulty in keeping the joints properly lubricated. The compound movements required of the components of the joint make it relatively difficult to effectively seal the housings around the joints. This increases the likelihood that deleterious materials such as dust or mud may find their way into damaging contact with the working surfaces of the components. It also presents the possibility that lubricant required in the joint to protect the working surfaces may be inadvertently flung from the joint during relatively high speed rotation of the shafts.

Attempts to alleviate the foregoing problems have included the use of dust covers or "boots" around the joint. Such boots, of leather, rubber, neoprene or some such material, provide some protection against ingress of dirt and egress of lubricant so long as they remain intact and in place. However, since covers of this type must be flexible to permit relative angular movement between the shafts, they are usually of relatively thin material and are highly likely to break or become displaced. When this happens, lubricant is often flung out of the joint and dirt enters through the break. The vehicle owner, for example, will likely not be aware of the problem until a very expensive replacement is required for the damaged constant velocity joint.

SUMMARY OF THE INVENTION

Accordingly, it is a primary object of the present invention to provide a constant velocity joint which is constructed in a manner making it inherently easier to seal constant velocity joints of this general type.

A further important object of this invention is to provide a constant velocity joint which can be effectively sealed against ingress of deleterious materials and egress of lubricant without the necessity for the use of relatively short lived boots, dust covers or similar structures for this purpose.

In the achievement of the foregoing object, it is yet another object of this invention to provide such a construction wherein boots or dust covers may be used in certain installations if desired to protect certain polished moving parts, yet wherein the primary sealing of the joint is carried out by sturdier conventional sealing components.

Another very important object of this invention is to provide a construction wherein the operative parts of the joint are interlocked in manner wherein they must be assembled together before they are installed in their housing, thereby permitting the use of a highly efficient but uncomplicated lock down plate as the means for holding the joint in its assembled condition.

A further object of this invention is to provide a constant velocity joint construction wherein the lock down plate as well as the seals for the joint are held in place by a single retainer plate, thereby greatly simplifying the construction of the joint while insuring better sealing of the joint than has heretofore been available for constant velocity joint.

Still another object of this invention is to provide a constant velocity joint wherein the component parts are relatively rugged, yet capable of being produced by conventional machining operations and wherein a cylindrical shoulder holds the joint sphere in its centered position to obviate the need for imposing relative close tolerances on the machining of the tongue and groove interfitted components.

These and other important aims and objectives of the present invention will be further described, or will become apparent from the following description and explanation of the drawings.

DESCRIPTION OF THE PREFERRED EMBODIMENT

Figure 1:
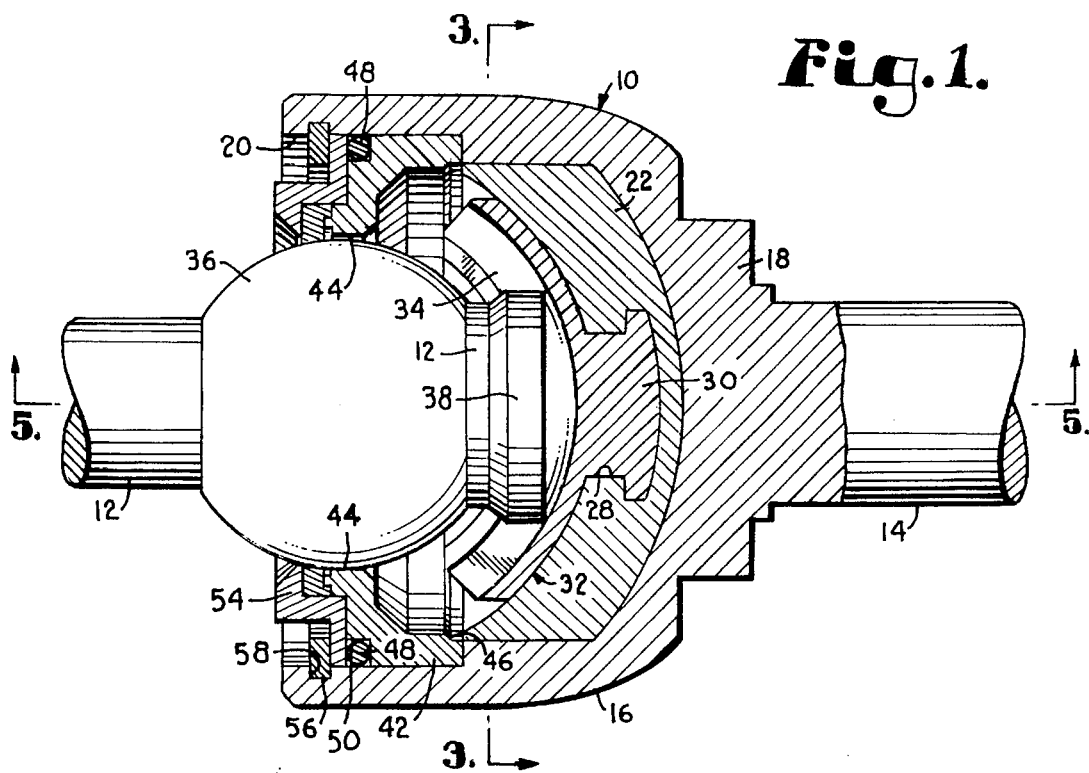
FIG. 1 is a fragmentary, detailed cross-sectional view of a constant velocity joint embodying the principles of this invention, parts being broken away and shown in cross-section to reveal details of construction.

A constant velocity universal joint embodying the principles of this invention is broadly designated in the drawings by the referenced numeral 10. Joint 10 includes an elongated transversely circular input shaft 12 adapted to be coupled with a source of power to be transmitted through joint 10 to an elongated, rigid preferably transversely circular shaft 14. The joint includes an enlarged, rigid housing 16 integrally secured to one end of output shaft 14 for rotation therewith. Housing 16 is configured as shown to define a cavity bounded by the annular side wall of housing 16 and the closed end 18 thereof. The outermost end 20 of housing 16 is initially open.

Figure 3:
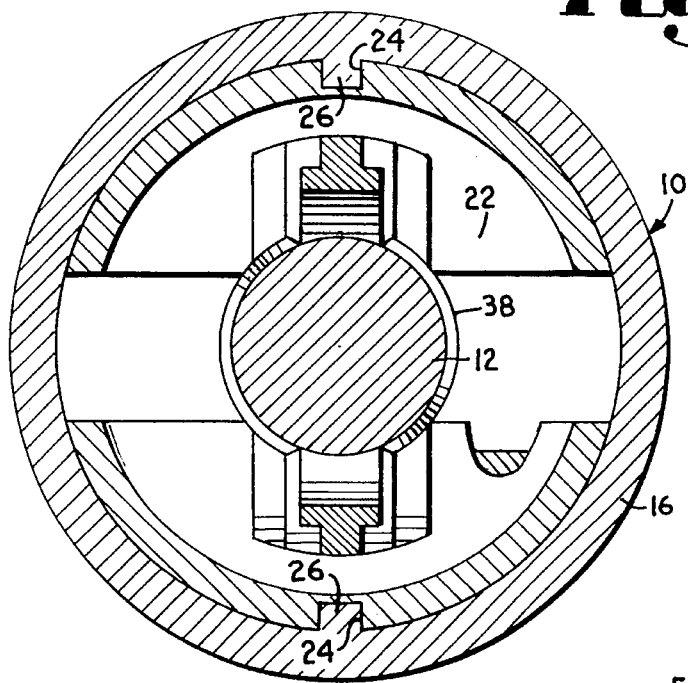
FIG. 3 is a detailed cross-sectional view taken along line 3—3 of FIG. 1.
Figure 4:
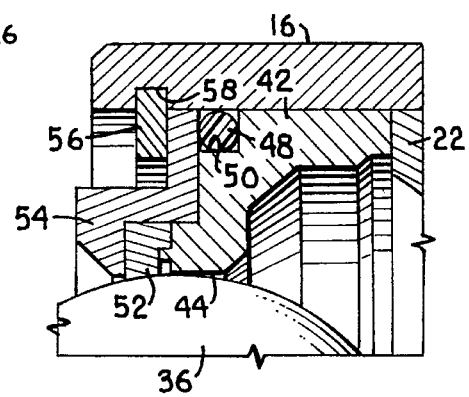
FIG. 4 is a fragmentary enlarged view similar to FIG. 1 showing the sealing components for the joint.

The cavity defining surface of the housing at its closed end 18 is preferably concave to complimentally receive a concavo-convex insert 22 of rigid material such as steel or the like. Insert 22 is provided with a pair of opposed, longitudinally extending grooves 24 which complimentally receive therein longitudinally extending ribs 26 formed on the inner surface of housing 16 as seen best in FIG. 3 of the drawing. The grooves 24 engaged on ribs 26 lock the insert with the housing so that they rotate together.

Figure 2:
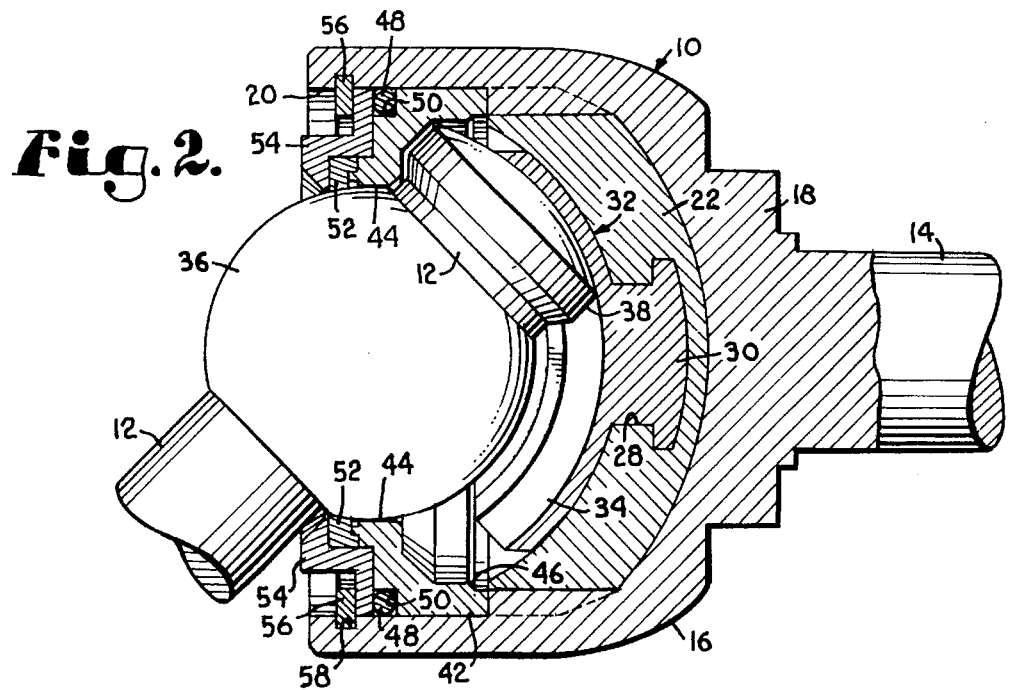
FIG. 2 is a view similar to FIG. 1 but showing the relative positions of the components with the input shaft extending at a substantial angle with respect to the output shaft.

Insert 22 is provided with an elongated, longitudinally arcuate groove or channel 28 extending across the insert. Channel 28 is of a generally T-shaped cross section as shown best in FIGS. 1 and 2 of the drawing.

Figure 5:
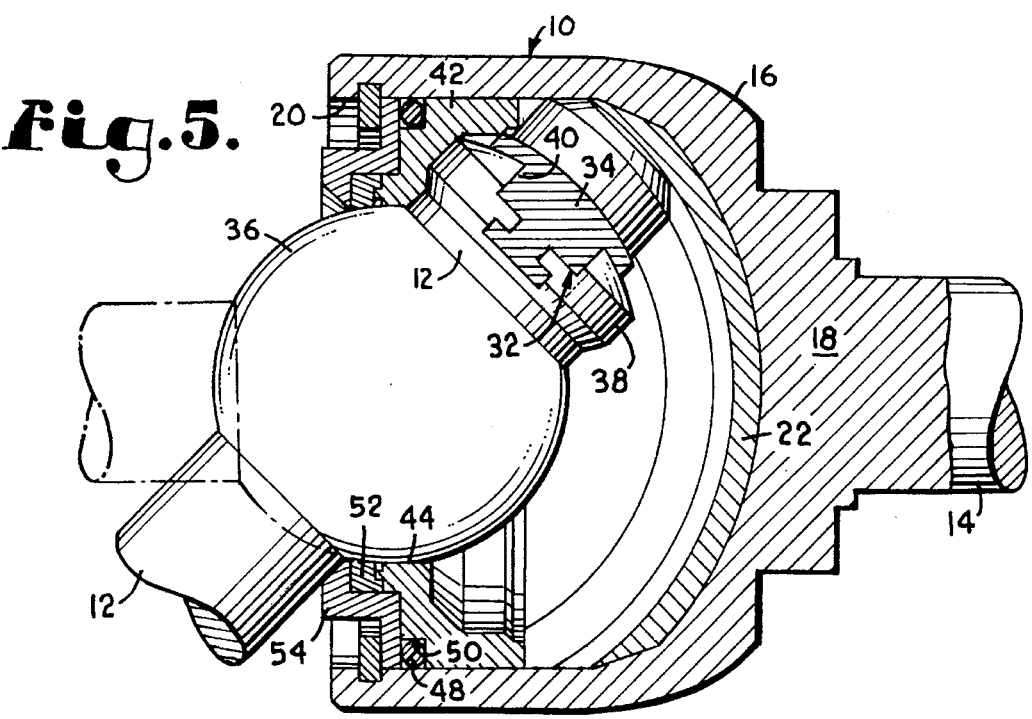
FIG. 5 is a fragmentary, detailed cross-sectional view taken along line 5—5 of FIG. 1, the position of the components with the input shaft at a substantial angle with respect to the output shaft being shown in solid lines, the aligned position for the input shaft being shown in broken lines.

Channel 28 is adapted to complimentally receive therein a similarly shaped, also longitudinally arcuate rigid projection or rib 30 carried by a center link 32 for the joint. Link 32 is of generally concavo-convex configuration somewhat in the shape of a cross having tongue 30 extending in one direction in groove 28 and also having a similarly shaped, elongated, longitudinally arcuate projection 34 extending at 90 degrees from the longitudinal direction of rib 30 as can be seen in the drawings. Link 32 is also formed of rigid material such as steel or the like. While the configuration of projection 34 has general similarity to the configuration of rib 30, the actual cross-sectional configuration of projection 34 is best shown in FIG. 5 of the drawing.

The end of input shaft 12 which projects into the cavity within housing 16 is provided with an integral, Frusto-Spherical enlargement 36. The end of input shaft 12 proximal link 32 has an integral connector 38 having an arcuate, elongated, transverse groove 40 shaped to complimentally receive projection 34 of link 32 for relative sliding, interlocked connection therewith. It should be pointed out at this juncture that the interlocked shoulders on the tongue and groove means interconnecting insert 22 with link 32 are configured to restrict relative movement of the input shaft with respect to the output shaft to angular movement about the center of the frustro-spherical enlargement 36. The interlocked shoulders restrict relative movement longitudinally of the output shaft. By the same token, the interlocked shoulders of the link projection 34 and the groove 40 of connector 38 also restrict relative movement longitudinally of output shaft 12 while permitting relative movement about the center of the spherical surface of enlargement 36. The longitudinal arcs of curvature of the interlocked tongue and grooved members are concentric to the spherical surface of enlargement 36 as are the arcs of curvature of the second interlocked tongue and groove means comprised of the link projection 34 and connector groove 40. This permits the relative movement between the components which is required to permit angularity between the input and output shafts during rotation of the interlocked shafts without changes in the velocity of the driven shaft during each revolution.

Means for holding the components in proper position within the housing cavity includes an annular collar 42 disposed around enlargement 36 and having a shoulder 44 disposed in facing relationship to the proximal spherical surface of enlargement 36 to confine the enlargement to against movement radially of shaft 12. Annular collar 42 is shaped in a manner that its inner surface allows maximum angular movement of enlargement 36. The inner contour is configured to allow such movement as may be seen by inspecting FIG. 5 of the drawing. The collar permits such angular movement of the shaft about the center of the spherical surface, but prevents the aforesaid radial movement.

Collar 42 has a downwardly facing shoulder 46 disposed to engage the proximal uppermost rim of insert 22 to hold the latter in its seated position. The interlocked tongue and groove means of the other components of the joint are held in place by the insert.

An o-ring seal 48 preferably of elastomeric materials such as neoprene or the like is received in an outwardly facing, annular groove 50 to seal the cavity in housing 16 from the flow of fluid or foreign matter between the collar and the proximal surface of housing 16. A second annular seal 52 preferable of similar material is received between the upper end of collar 42 and an annular seal retainer plate 54 having a transversely, generally z-shape to hold the outer surfaces of seals 48 and 52 in sealing engagement with the surfaces against which they are disposed. A lock ring 56 is received within an annular groove 58 extending around the inner surface of housing 16 proximal the open end of the housing. Ring 56 holds all of the components in proper position. The central opening of retainer plate 54 is outwardly beveled to accommodate angular displacement of input shaft 12 with respect to the longitudinal axis of output shaft 14 as shown best in FIGS. 2 and 5 of the drawing.

In operation, torque may be applied to input shaft 12 to rotate the shaft. The power is transferred through the joint to rotate output shaft 14 because of the nonrotatable coupling between connector 38 and link 32. At the same time, angular displacement of input shaft 12 about the center of spherical enlargement 36 is permitted because of the interlocked tongue and groove connection between the link 32 and the connector 38.

In similar fashion, rotation of the link 32 results in corresponding rotation of the insert 22. However, angular displacement in a direction normal to the displacement accommodated by connector 38 is accommodated by the interlocked tongue and groove connection between the link 32 and insert 22. The insert 22 is locked with housing 16 so the power is applied to output shaft 14 by the rotating housing. Universal angular displacement between the two rotating shafts permits the components to shift with respect to each other during such rotation so that the plane of the driving contact between the input shaft and the output shaft at the joint is always bisecting the angle of displacement between the respective longitudinal axes of the shafts. This insures constant velocity of the driven shaft.

It should be pointed out that the construction for joint 10 wherein the interlocked, relatively slidable components are disposed within a cup shaped cavity permits a relatively straight forward and very effective seal across the outer open end of the cavity to effectively seal the joint. This construction eliminates the need for a flexible cover in the nature of a boot, jacket, or the like to hold the necessary lubricant within the joint and to protect against the ingress of water, dirt, mud or the like into damaging contact with the sliding joint components. The spherical surface of the enlargement 36 is relatively easy to seal effectively while also permitting the required range of angularity between the shafts. On the opposite side, the o-ring effectively seals between the hold down collar and the housing surface.

It is contemplated that a boot or dust cover may be installed, if desired, between the housing and input shaft 12. Such a cover would have the advantage of protecting the polished surface of the spherical enlargement. However, the function of the dust cover can be limited to a mere protective role because the essential sealing against egress of lubricant from the joint and ingress of foreign deleterious materials into the joint is effectively provided by seals 48 and 52 as hereinbefore described. It will be readily understood by those skilled in the art that the construction described is particularly well suited to prevent the slinging of lubricant from the joint during relatively high speed rotation of the joint components.

A significant feature of joint 10 is its construction from components which are locked together by tongue and groove connections. This construction permits the several parts to be individually machined as required while the parts are disassembled and outside of the housing. The machining operations are relatively easy at this time. Only relatively simple machining operations are required in the housing, such as the application of the concave surface in the closed end of the housing. Even this operation is accomplished relatively easily before the other components are placed into the housing.

However, once the parts have been machined as required, they must be assembled together before they are installed in the housing. The parts are interlocked, so this produces the highly desirable result of permitting the joint to be held together with a hold down plate held in place by a single retainer. The interconnected tongue and groove construction of the connections which must constantly change relative positions to effect constant velocity transmission permits use of wider tolerances in machining the mating surfaces than would be possible with other designs. Any looseness which might result from the use of such tolerances can be easily snugged by the hold down plate.

Having described the invention what is claimed:

1. A constant velocity joint assembly comprising:

a hollow housing closed at one end to define a cup shaped cavity, the other end of the housing being open to define a housing open end and to provide access into the cavity;

an output shaft connected to the housing for rotation therewith;

a rotatably input shaft having an end extending into the cavity through said housing open end and having a longitudinal axis;

means in the cavity interconnecting the input shaft with the housing for rotating the housing at the velocity of rotation of the input shaft uniformly throughout each revolution despite variations in the angle of alignment of the respective input and output shafts, wherein said interconnecting means includes an insert adapted to be received in said cavity, there being an elongated, arcuate groove in the insert, said groove having an open side facing the input shaft;

a link having an elongated, rigid, arcuate rib complementally received in said groove for sliding movement of the rib with respect to the groove, the groove and rib being configured for mutual interlocked relationship to prevent relative separating movement of the groove and rib;

said link having an elongated, rigid, arcuate projection extending transversely to said rib and projecting toward the input shaft;

an elongated arcuate channel extending across the proximal end of the input shaft with said link projection complementally received therein, the channel and the projection being configured for mutual interlocked relationship to prevent relative separating movement of the channel and the projection;

whereby the housing and output shaft are operably coupled to the input shaft for rotation thereby through the insert and said link such that the relative sliding of the link rib and projection in the groove and channel respectively allow relative movement of the joint components to provide said uniform velocity irrespective of the angularity between said shafts; and seal means interposed across said housing open end and around the input shaft for sealing the cavity against ingress of deleterious materials and egress of lubricant.

2. A joint assembly as set forth in claim 1, wherein said input shaft has a frusto-spherical enlargement integrally secured thereto and extending at least partially into the cavity, and wherein the arcuate rib, groove, projection and channel each have a curvature, the curvatures of said longitudinal arcuate rib, groove, projection and channel respectively being concentric to the outer surface of said frusto-spherical enlargement.

3. A joint construction as set forth in claim 2, wherein said seal means includes an annular collar in the open end of the housing and disposed around the frusto-spherical enlargement there being an elastomeric seal interposed between the outer periphery of the collar and the proximal surface of the housing.

4. A joint assembly as set forth in claim 3, wherein said collar has a cylindrical shoulder disposed in relatively close, offset relationship around the curved surface of the enlargement, the cylindrical shape of said shoulder permitting limited movement of the input shaft longitudinal of its axis while restricting against movement of the frusto-spherical enlargement in a direction radial of the shaft.

5. A joint assembly as set forth in claim 4, wherein said seal means also includes a second annular elastomeric seal extending around the input shaft in sealing engagement with the outer surface of said frusto-spherical enlargement and with said collar, and an annular retainer plate received in the open end of said housing and around said frusto-spherical enlargement in disposition engaging said second elastomeric seal to hold the second elastomeric seal in said sealing engagement with the outer surface of said frusto-spherical enlargement and said collar.

6. A constant velocity joint assembly comprising:

an elongated, rigid output shaft having a rigid housing secured rigidly thereto,. there being a cavity in the housing aligned with the longitudinal axis of the output shaft, said housing having an open end facing away from the output shaft, said open end communicating with the cavity;

a rigid insert adapted to be complementally received in the cavity;

means operably engaging the insert and the housing for coupling the insert and housing for rotation together;

a first interengaged tongue and groove means for coupling a rigid link to the insert for transmitting rotational torque, said tongue and groove means permitting movement of the link back and forth along a first single curved path of travel with respect to the insert;

a second interengaged tongue and groove means for coupling an elongated, rigid, rotatable power input shaft with said link, said input shaft having one end projecting into the cavity through said open end of the housing, said tongue and groove means transmitting rotational torque and permitting movement of the input shaft back and forth along a second single curved path of travel with respect to the link, the path of travel of the input shaft with respect to the link being disposed at ninety degrees from the path of travel of the link with respect to the insert;

a frusto-spherical enlargement carried by the input shaft for rotation therewith;

collar means for restricting movement of the frusto-spherical enlargement radially of the input shaft, said collar means disposed around the frusto-spherical enlargement in the cavity and having a cylindrical shoulder;

seal means extending between the housing and the surface of said frusto-spherical enlargement proximal said open end of the housing to seal the cavity;

said first and second inter engaged tongue and groove means each having longitudinal acruate curvature concentric with the spherical surface of said enlargement to permit relative angular displacement of the input and output shafts during rotation necessary for maintaining constant velocity of the output shaft through each revolution thereof; and wherein both of said interengaged tongue and groove means include shoulder means disposed to prevent relative movement of the input shaft, the link and the insert components of the joint with respect to each other longitudinally of the input shaft.

* * * * *